(Model.)
S. C. TAFT & F. DARLING.
Tube Cleaner.
No. 230,588. Patented July 27, 1880.
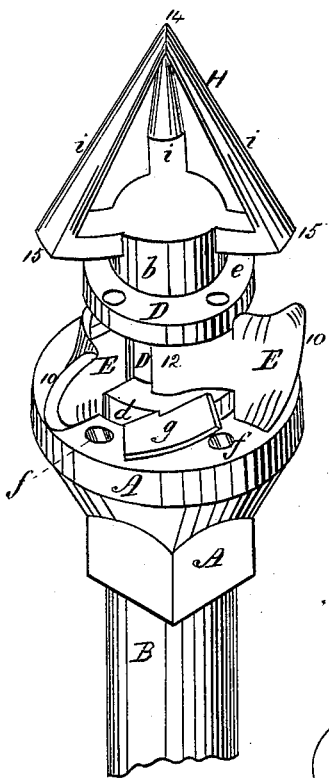
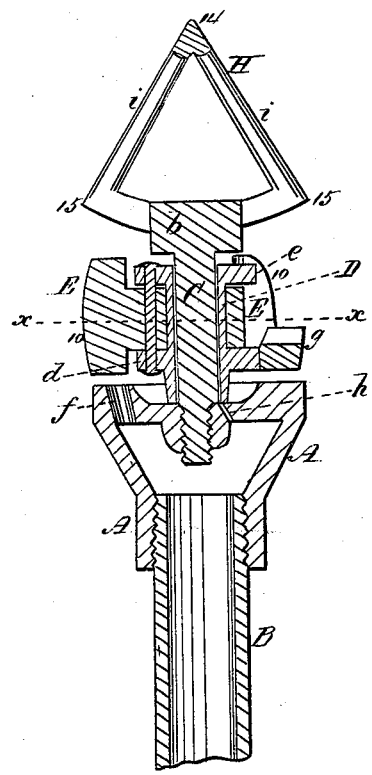
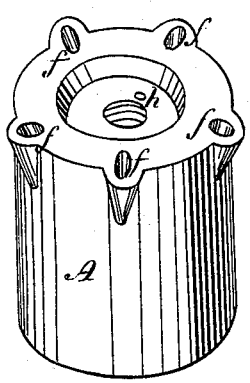
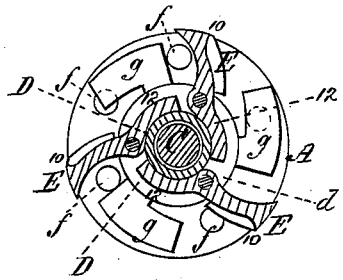
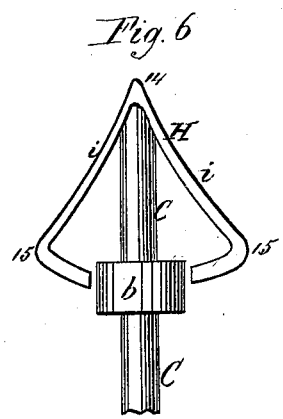
Witnesses:
W. J. Cambridge
Chas. E. Griffin
Inventors,
Stephen C. Taft
Fenner Darling
per J. E. Teschemacher
Att'y

UNITED STATES PATENT OFFICE.

STEPHEN C. TAFT AND FENNER DARLING, OF FRANKLIN, MASSACHUSETTS.

TUBE-CLEANER.

SPECIFICATION forming part of Letters Patent No. 230,588, dated July 27, 1880.

Application filed June 11, 1880. (Model.)

*To all whom it may concern:*

Be it known that we, STEPHEN CLARENDON TAFT and FENNER DARLING, citizens of the United States, residing at Franklin, in the county of Norfolk and State of Massachusetts, have invented an Improved Implement for Cleaning the Tubes or Flues of Steam-Boilers, of which the following is a full, clear, and exact description, reference being had to the accompanying drawings, making part of this specification, in which—

Figure 1 is a perspective view of our improved implement. Fig. 2 is a longitudinal section through the center of the same. Fig. 3 is a horizontal section on the line $x\ x$ of Fig. 2. Fig. 4 is a sectional detail. Fig. 5 is a view of a hollow body or casing of a different form to that shown in Fig. 1. Fig. 6 is an elevation of a guide of a different construction to that shown in Fig. 1.

The ordinary hand-scraper for cleaning boiler-flues and tubes is objectionable for the reason that much manual force is required to move it back and forth within the tube, while it fails to accomplish the purpose for which it is intended, as the yielding of the spring scraper-blades causes them to pass over the hard scale and incrustations of the tube without removing them.

Steam-cleaners have also been employed which caused a powerful jet or blast of steam to be projected through the tubes; but these cleaners also proved ineffectual, as the steam merely expelled the loose particles of soot and scale, leaving the greater portion of the incrustation or deposit still adhering to the tubes.

Our invention has for its object to entirely overcome all of the above-mentioned difficulties, and to provide a means for effectually and rapidly removing all of the incrustations or deposits from the interior of a boiler tube or flue; and it consists in an implement which is adapted to be attached to the end of a steam-pipe having a flexible or jointed connection with a generator from which steam is supplied, this pipe serving as a handle by which the implement is moved back and forth through the tube to be cleaned, the implement being provided with a rotating spool or hub, to which are pivoted a series of scraper blades or cutters having their surfaces curved or inclined and adapted to be rotated by the impingement thereon of jets of steam, which are discharged from suitable apertures in the body or casing of the implement into which the steam is introduced from the long pipe or handle, by which it is pushed through the boiler-tube, these scraper-blades being rapidly rotated by the steam-jets as the implement is forced through the tube, and serving to cut away and entirely remove all incrustations and deposits therefrom, any obstructions of a hard nature—such as scales and blisters—causing the blades to yield or move inward on their pivots, which prevents their rotation from being arrested, and allows them to finally cut away and remove the obstruction as the implement is repeatedly moved back and forth in contact therewith.

Our invention also consists in the combination, with the rotating scraper-blades or cutters, of a tapering guide composed of a series of rigid or spring arms or bars inclined toward the axis of the implement, and attached to the front thereof, this guide serving to facilitate the operation of introducing the implement within the end of the tube to be cleaned, and also to maintain the rotating spool and its scraper-blades in their proper central position within the tube while in operation.

Our invention also consists in the employment of a series of steam-blades attached to the rotating spool or hub midway between the pivoted scraper-blades or cutters, these auxiliary blades affording an additional surface for the jets of steam to impinge upon, whereby the entire force of the steam is utilized without waste or loss, which causes a greatly-increased power to be applied to the rotation of the scraper-blades.

Our invention also consists in introducing steam between the rotating scraper-spool and its journal or spindle, the steam not only serving as a lubricator for the bearing, but also preventing the accumulation or lodgment of fine dust on the bearing-surfaces, which would soon cut and wear them out.

To enable others skilled in the art to understand and use our invention, we will proceed to describe the manner in which we have carried it out.

In the said drawings, A represents the hollow body of the implement, which consists of a metallic shell or casing of conical, cylindrical, or other suitable form, as seen in Figs. 1 and 5, and of a little less diameter than that of the boiler tube or flue through which it is to be passed, so as to leave a space for the entrance of air between the two, for a purpose to be hereinafter described.

The opening at the rear end of the body A is provided with a screw-thread to facilitate its attachment to one end of a long pipe, B, which serves as a handle for moving the implement back and forth within the boiler-tube, the opposite end of the pipe B having a jointed or flexible connection (not shown) with a generator from which steam is supplied to the hollow body A, which thus forms a steam-chamber.

From the center of the closed front end of the body A projects a removable journal or spindle, C, upon which is loosely fitted, so as to revolve freely thereon, a spool or hub, D, which is kept in place by a head or collar, $b$, and between the flanges $d\ e$ of this spool are pivoted, at equal distances apart, a series of scraper-blades or cutters, E, the surfaces of which outside the flanges $d\ e$ are curved or inclined so as to resemble the blades of a marine screw or propeller, each blade having cutting-edges 10.

$f$ are a series of steam-passages, which communicate with the interior of the body A, and have their outlets in the front end thereof, near the edge, and from these outlets are discharged a series of powerful jets of steam, which impinge against the curved or inclined faces of the scraper-blades or cutters, causing them, with their spool D, to revolve with great rapidity as the implement is pushed through the boiler-tube, and thus rapidly cut away and remove all scale or other incrustations with which they come into contact, the rotation of the scraper-blades or cutters creating a strong current of air in the direction in which the implement is being moved, which, together with the steam issuing from the discharge-outlets $f$, serves to expel all the soot, scale, or other deposits which are cut away by the revolving scraper-blades. As the blades revolve a vacuum is created behind them, which is filled with air entering through the annular space between the body A and the boiler-tube.

To the rear flange, $d$, of the spool D are secured a series of small auxiliary blades, $g$, which are inclined to the axis of rotation, each blade $g$ being located midway between two contiguous scraper-blades, E, and by this construction additional surface is afforded for the jets of steam to impinge upon, so that the force of each jet will be continuously applied to the scraper and auxiliary blades in such a manner that the entire force of the steam will be utilized to its maximum extent, thus greatly increasing the power which is applied to the rotation of the scraper-blades.

The shank or rear portion, 12, of each blade E strikes the spool, which thus serves as a stop to limit the outward throw of its cutting-edge 10, which prevents it from being thrown out beyond the proper point, and in the event of the blades E coming into contact with any obstructions of a hard or refractory nature—such as scales or blisters—they will yield or move inward on their pivots, so as to withdraw their cutting-edges and allow of their passing the obstructions without having their rotary movement stopped thereby, and when such an obstruction is encountered it is merely necessary to move the implement back and forth a few times in contact therewith to insure its being entirely removed or cut away by the rapidly-revolving scraper-blades.

The steam-passages $f$ are preferably made oblique or inclined to the plane of the axis of rotation, as shown in Fig. 4, in order that the jets of steam may impinge upon the blades E $g$ in a direction nearly perpendicular to their faces, which insures the full force of the steam being utilized and its maximum power secured.

$h$ is a small steam-passage or discharge-exit leading from the interior of the body A or steam-chamber to a point in the front end thereof opposite to or in line with the space between the spool D and its journal or spindle C, which is thus filled with steam, which not only serves as a lubricator for the bearing, but also effectually expels any fine dust which may enter this space, thus preventing the bearing-surfaces from being cut or worn away, as would otherwise occur.

To that portion of the spindle C in front of the collar or head $b$ are secured a series of bent arms or bars, $i$, which are inclined so as to meet at the point or end 14, a tapering guide, H, being thus formed, which greatly facilitates the operation of introducing the implement within the end of the boiler-tube, and also serves to keep the rotating scraper-blades in their proper central position within the tube while performing their work.

The guide H may consist of any desired number of arms or bars, $i$, and these bars may be rigid, as seen in Figs. 1 and 2; or yielding spring-arms having one end free, as seen in Fig. 6, may be employed, if preferred, in order to facilitate the passage of the implement through the tube if the latter should be clogged with a thick deposit or incrustation. The guide should, however, in all cases be of a little less diameter than that of the tube to be cleaned, to allow the implement to pass easily through it.

The corners 15 of the guide H, as well as the corners of the scraper-blades E, may be rounded to prevent them from catching and interfering with the withdrawal of the implement after pushing it entirely through and beyond the end of the flue or tube.

What we claim as our invention, and desire to secure by Letters Patent, is—

1. A boiler-tube cleaner adapted to be forced through the tube and provided with rotating scraper-blades or cutters, actuated by jets of steam impinging thereon, substantially as described.

2. In an implement for cleaning boiler-tubes, the combination, with the hollow body or casing A, adapted to be secured to the end of a steam-pipe and forced through the boiler-tube, of the curved or inclined rotating scraper-blades or cutters E, pivoted to the spool or hub D, revolving on the journal or spindle C, and actuated by jets of steam issuing from passages or discharge-outlets $f$ in the body A, substantially in the manner and for the purpose set forth.

3. In an implement for cleaning boiler-tubes, the combination, with the hollow body A, provided with steam-discharge outlets $f$, of the revolving spool or hub D, provided with pivoted scraper-blades or cutters E, and auxiliary steam-blades $g$, arranged between the blades E, operating substantially in the manner and for the purpose described.

4. In an implement for cleaning boiler-tubes, the combination, with the hollow body A and its rotating scraper-blades or cutters E, actuated by jets of steam, as described, of the tapering guide H, composed of a series of rigid or spring arms or bars, $i$, inclined toward the axis of the implement and applied to the front end thereof, substantially as and for the purpose set forth.

5. In an implement for cleaning boiler-tubes, the combination, with the rotating spool or hub D, of the curved or inclined scraper-blades or cutters E, having their rear portions, 12, pivoted between the flanges $d\ e$ and adapted to strike the spool, so as to limit the outward throw of their cutting-edges 10, substantially as described.

6. In an implement for cleaning boiler-tubes, the body A, provided with a steam-passage or discharge-exit, $h$, for the purpose of conducting steam from the steam-chamber to the space between the rotating spool D and its spindle or journal C, substantially as and for the purpose set forth.

Witness our hands this 9th day of June, A. D. 1880.

STEPHEN CLARENDON TAFT.
FENNER DARLING.

In presence of—
  A. A. RUSSEGUE,
  CHARLES F. BAKER.